United States Patent
Klinger (10) Patent No.: US 9,311,077 B2
(45) Date of Patent: Apr. 12, 2016

(54) IDENTIFICATION OF CODE CHANGES USING LANGUAGE SYNTAX AND CHANGESET DATA

(71) Applicant: International Business Machines Corporation, Armonk, NY (US)

(72) Inventor: Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/853,099

(22) Filed: Mar. 29, 2013

(65) Prior Publication Data

US 2014/0298290 A1 Oct. 2, 2014

(51) Int. Cl.
G06F 21/57 (2013.01)
G06F 9/44 (2006.01)

(52) U.S. Cl.
CPC ........................................ G06F 8/71 (2013.01)

(58) Field of Classification Search
None
See application file for complete search history.

(56) References Cited

U.S. PATENT DOCUMENTS

| | | | |
|---|---|---|---|
| 8,117,598 B2 | 2/2012 | Johnson et al. | |
| 8,276,126 B2 | 9/2012 | Farnham et al. | |
| 2011/0035726 A1* | 2/2011 | Davies et al. | 717/110 |
| 2012/0167040 A1 | 6/2012 | Davies et al. | |
| 2012/0210298 A1 | 8/2012 | Hodgins et al. | |
| 2013/0074035 A1* | 3/2013 | Nomura | 717/110 |

FOREIGN PATENT DOCUMENTS

WO 2008119572 A1 10/2008

OTHER PUBLICATIONS

G. Canfora et al.; "Identifying Changed Source Code Lines from Version Repositories"; Fourth International Workshop on Mining Software Repositories; Copyright 2007 IEEE.
IBM; "A method to evaluate the risk of source code changes"; IP.com Prior Art Database Technical Disclosure; IPCOM000180854D; Publication Date: Mar. 19, 2009; <http://www.ip.com/pubview/IPCOM000180854D>.
"About JRipples"; JRipples tool for Incremental Change; Printed Jan. 28, 2013; <http://jripples.sourceforge.net>.
Huzefa Kagdi; "Improving Change Prediction with Fine-Grained Source Code Mining"; ASE '07; Nov. 5-9, 2007; Atlanta, Georgia; Copyright held by the author/owner(s).
W. Snipes et al.; "Code Hot Spot: A Tool for Extraction and Analysis of Code Change History"; 2011 27th IEEE International Conference on Software Maintenance (ICSM); pp. 392-401; Copyright 2011 IEEE.

* cited by examiner

Primary Examiner — Li B Zhen
Assistant Examiner — Amir Soltanzadeh
(74) Attorney, Agent, or Firm — Isaac J. Gooshaw (57) ABSTRACT

A computer retrieves a first changeset that is associated with a program. The computer identifies a first set of changes included in the first changeset based on a time stamp of a change, textual matching, and syntactical matching. The computer identifies a first area of interest within a source code of the program based, at least in part, on the first set of changes. The computer searches for a second set of changes based, at least in part, on the first area of interest. The computer generates a result that includes, at least in part, the first set of changes.

20 Claims, 3 Drawing Sheets

IDENTIFICATION OF CODE CHANGES USING LANGUAGE SYNTAX AND CHANGESET DATA

FIELD OF THE INVENTION

The present invention relates generally to the field of program regression, and more particularly to the identification of code changes, using the syntax of the code language and changeset data, that causes program regression.

BACKGROUND OF THE INVENTION

The need for a logical way to organize and control revisions has existed for almost as long as writing has been in existence. However, revision control has become much more important, and complicated, with the advent of computer programs.

Large modern software development projects are often developed from complex designs. Often, a software development project can become very complex as the design evolves from the prototype stage to the fully fledged commercialization of the software project. Thus, when developers write code based upon a complex design, errors are inevitable. Often, the complexity of the design increases as the software moves from prototyping to commercialization because of additional functionality that is incorporated into the prototype, or oversights and shortcomings in the design that become apparent to designers and developers over time. Therefore, revision control has become increasingly important for software development.

Some of the most capable, and most complex, revision control systems are those used in software development. Often, an entire development team has access to and may change a piece of software that is being developed. Therefore, software developers sometimes use revision control software to maintain documentation and configuration files, as well as source code. As changes are made to a program, a changeset is generated that documents what changes were made. A changeset is a group of changes grouped by a period of time, such as a day or a short period when the code has been checked in and out of a source code management system. A changeset can comprise changes from a single developer or group of developers.

Typically, computer programs are written using specific programming languages. All programming languages have some primitive building blocks for the description of data and the processes or transformations applied to them (like the addition of two numbers or the selection of an item from a collection). These primitive building blocks are defined by sets of syntactic and semantic rules which describe their structure and meaning respectively.

Often, computer programs communicate with and work in conjunction with other computer programs. Therefore, a change in the functioning of one program can adversely affect the functioning of other programs and lead to program reversions. If the programs are written in the same program language it may be possible to identify the change that caused the reversion. However, if the programs are written in different languages, then it can become far more difficult to identify the source of the reversion.

SUMMARY

Embodiments of the present invention disclose a method, computer program product, and system for identifying code changes. A computer retrieves a first changeset that is associated with a program. The computer identifies a first set of changes included in the first changeset based on a time stamp of a change, textual matching, and syntactical matching. The computer identifies a first area of interest within a source code of the program based, at least in part, on the first set of changes. The computer searches for a second set of changes based, at least in part, on the first area of interest. The computer generates a result that includes, at least in part, the first set of changes.

DETAILED DESCRIPTION

The syntax of a program language describes the possible combinations of symbols that form a syntactically correct program, i.e., the combinations of symbols that are considered to be correctly structured programs in that language. The meaning given to the combination of symbols is controlled by the semantics of the program language, which can be either formal or hard-coded in a reference implementation. The syntax of a language defines its surface form. Most programming languages are purely textual; they use sequences of text including words, numbers, and punctuation, much like written natural languages. Text-based programming languages are based on sequences of characters. Conversely, there are some programming languages which are more graphical in nature and use visual relationships between symbols to specify a program. Visual programming languages are based on the spatial layout and connections between symbols, which may be textual or graphical.

The lexical structure of a textual language specifies how characters must be sectioned into tokens. A token is a string of characters, categorized according to the rules as a symbol (e.g., an identifier, a number, or a comma). Other syntax rules specify the permissible sequences of these tokens and the process of assigning meaning to these token sequences is part of semantics.

The syntax of textual programming languages are usually defined using a combination of regular expressions for lexical structure, and Backus-Naur Form for grammatical structure, to inductively specify syntactic categories (non-terminals) and terminal symbols. Syntactic categories are defined by rules called productions, which specify the values that belong to a particular syntactic category. Terminal symbols are the concrete characters or strings of characters (for example, keywords such as define, if, let, or void) from which syntactically valid programs are constructed.

A syntactical analysis of source code usually entails the transformation of the linear sequence of tokens into a hierarchical syntax tree. For example, abstract syntax trees are one form of syntax tree. The process of transforming the linear sequence of tokens into a hierarchical syntax tree is called parsing.

In computer software engineering, revision control is any practice that tracks and provides control over changes to source code. As multiple individuals design, develop and deploy software, it is common for multiple versions of the same software to be deployed in different sites and for the multiple individuals to be working simultaneously on updates. Program bugs or features of the program are often only present in certain versions of the program.

Often, as a program is developed, program bugs arise from the process of patching, or fixing, problems in the program. As the program bugs are patched, new program bugs can be unexpectedly produced. A program bug is an error, flaw, mistake, failure, or fault in a computer program or system that produces an incorrect or unexpected result, or causes the program to behave in unintended ways. A software regression is a type of program bug that makes a feature stop functioning as intended after a certain event, e.g., a program patch is executed. A program performance regression is a type of software regression where the program still functions correctly, but performs slowly or uses more memory when compared to previous versions of the program.

Typically, program bugs arise from mistakes and errors made by individuals in either a program's source code or the design of the program, and a few are caused by compilers producing incorrect code. Program bugs can trigger errors that can in turn have a wide variety of ripple effects, e.g., a systemic spread of an error, with varying levels of inconvenience to the user of the program. Certain program bugs can have subtle effects on the functionality of a program and may go undetected for an extended period of time. In contrast, more serious bugs may cause the program to completely cease functioning, i.e., a program crash.

In an effort to reduce the time spent tracking down the sources of program bugs, revision control systems are often employed to generate records of the changes made to programs, which are often in the form of changesets. While, a changeset can be helpful in identifying a change, to the data included in the changeset, the changeset may not be sufficient to identify the source of a program bug. For example, a changeset may not identify the source of a program bug if the program bug resulted from the interaction of one program with another. Further, as programs are developed numerous updates to line numbering, file names, method classes, and methods can make it very difficult to track down the actual source of a program bug. Tracking down the source of a program bug can be further complicated by compiling errors and errors resulting from two interacting programs being written in different program languages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
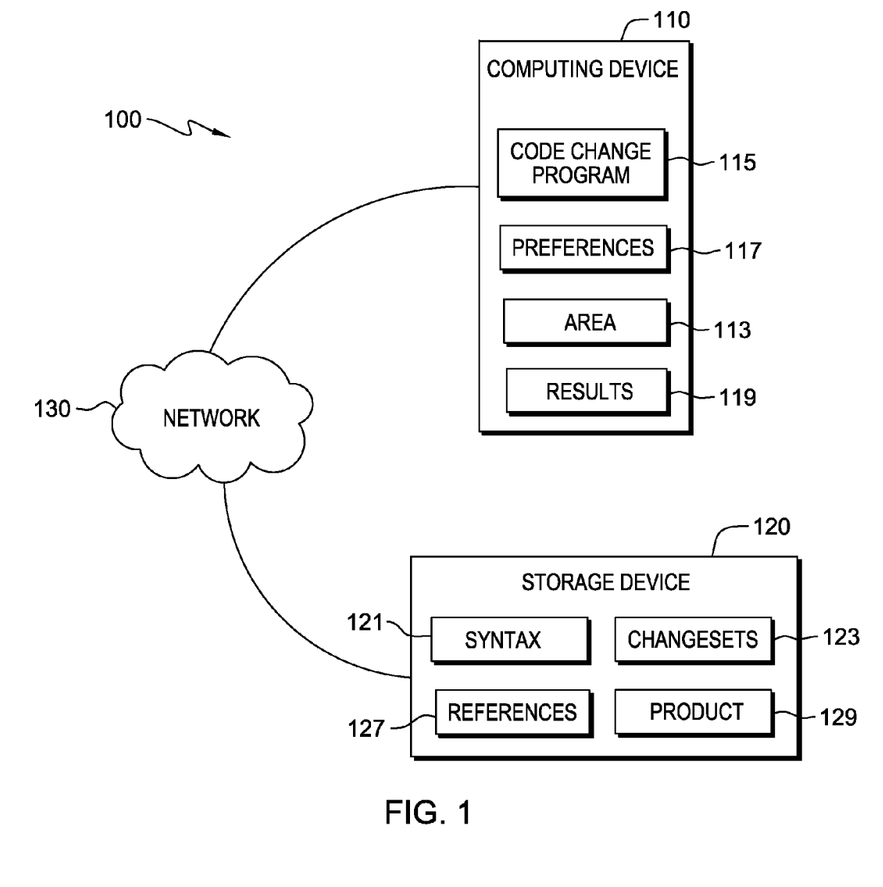
FIG. 1 is a functional block diagram illustrating a revision control environment, in accordance with an exemplary embodiment.

The present invention will now be described in detail with reference to the Figures. FIG. 1 is a functional block diagram illustrating a revision control environment, generally designated 100, in accordance with one embodiment of the present invention.

Revision control environment 100 includes computing device 110, and storage device 120 connected over network 130. Computing device 110 includes area 113, code change program 115, preferences 117, and results 119. Storage device 120 includes syntax 121, changesets 123, references 127, and product 129.

In alternative embodiments, code change program 115 and preferences 117 may be stored externally to computing device 110 and accessed through network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and storage device 120 in accordance with an exemplary embodiment of the present invention.

In various embodiments of the present invention, computing device 110 can be a server, a laptop computer, a tablet computer, a netbook computer, a personal computer (PC), desktop computer, a personal digital assistant (PDA), a smart phone, or any programmable electronic device capable of communication via network 130. In other exemplary embodiments, computing device 110 can represent a computing system utilizing clustered computers and components to act as a single pool of seamless resources. In general, computing device 110 is a computing device with access to area 113, code change program 115, preferences 117, and results 119, and is capable of executing code change program 115, and has to access the functions and attributes of storage device 120. Computing device 110 may include internal and external hardware components, as depicted and described in further detail with respect to FIG. 3.

In various embodiments of the present invention, storage device 120 is a data storage device in communication with computing device 110. In general, storage device 120 is a data storage device used to store data, such as the data included in syntax 121, changesets 123, references 127, and product 129. Typically, the data included in syntax 121, changesets 123, references 127, and product 129 is accessed as needed by computing device 110 via network 130. In some embodiments, storage device 120 is integral with computing device 110.

In an exemplary embodiment, product 129 is a program that is being developed or is in the process of being updated. As changes are made to product 129, records of the changes made are created and stored as changesets 123. Syntax 121 are files containing the syntax information of various program language(s) used to create program 129 as well as the syntax information of language(s) used to create any programs included in references 127. In general, references 127 includes a list of programs that interact with product 129, during the normal functioning of product 129. In certain exemplary embodiments, references 127 can further include copies of the actual programs and/or records of the specific program code with which product 129 interacts.

In an exemplary embodiment, code change program 115 is a program that identifies changes in the program code of product 129. Typically, code change program 115 receives a set of user preferences, which are stored as preferences 117, and applies those preferences to generate an area of interest, which is a selection of program code herein denoted as area 113, and performs a search of changesets 123 based on the area of interest. As changes in product 129 are identified, code change program 115 updates the area of interest according to the changes and saves the new area of interest as part of area 113. In general, changes identified during the search are saved as results 119. Code change program 115 typically presents the results of the search in the form of a report. For further details regarding the functioning of code change program 115 see the discussion of FIG. 2 below.

Figure 2:
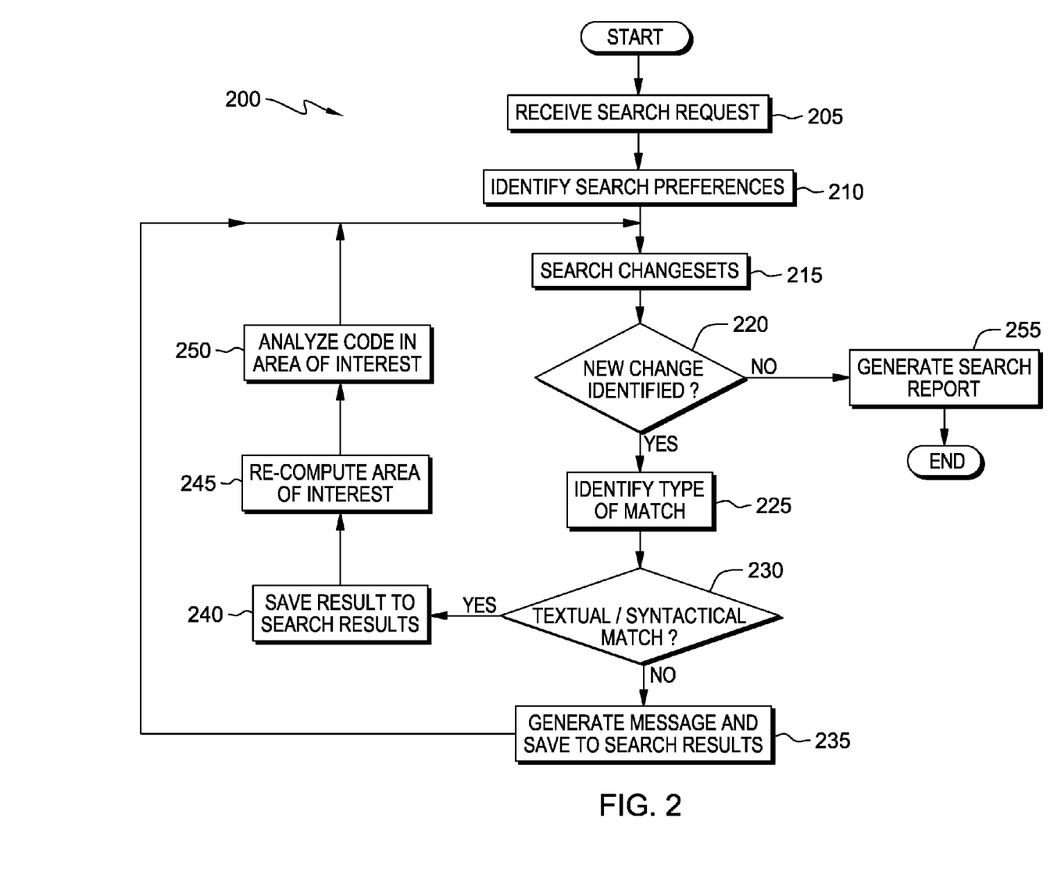
FIG. 2 illustrates operational steps of a code change program, on a computing device within the revision control environment of FIG. 1, in accordance with an exemplary embodiment.

FIG. 2 is a flow chart, 200, illustrating the operational steps utilized by code change program 115 to identify the changes made to product 129, in accordance with an exemplary embodiment.

In an exemplary embodiment, in response to receiving the request for a search, step 205, code change program 115 identifies and retrieves the search preferences from preferences 117, in step 210. Typically, the search preferences are customized by a user to indicate a specific period of time and an area of interest, included in area 113, to be searched for changes to the program of product 129. For example, after a week of updating product 129, a software engineer attempts to run a simulation to test the functionality of product 129. The results of the test indicate that product 129 is running twice as slow as the non-updated version. The software engineer customizes preferences 117 to include the time period of that week as a search parameter and executes a search using code change program 115.

In an exemplary embodiment, in step 215, code change program 115 searches the changesets of product 129, which are included in changesets 123 of storage device 120, for any changes that were logged during the specified period of time. If a new change is identified (decision step 220, yes branch), then code change program 115 attempts to identify the type of change as a textual match or as a syntactical match in step 225. To identify a textual match, code change program 115 examines the source code of the change as text, i.e., the source code examined without knowledge of the language syntax. In other words, sequences of text, including sequences of characters words, numbers, and punctuation, are examined to identify matches between the logged changes and the source code. If the changes associated with a changeset, e.g., additions, removals, and updates, affect the area of interest, then there is a textual match. For example, an area of interest includes lines 50-120 in source A and the change indicates the removal of lines 30-40. The removal of lines 30-40 therefore shifted the area of interest because the numbering of the lines included in the area of interest was changed. Since the change affects some of the lines included in the area of interest, this is considered a textual match.

In an exemplary embodiment, to identify a syntactical match, code change program 115 examines the source code of the change using knowledge of the system and framework code. The knowledge of various language syntax, system code, and framework code are included in syntax 121. In general, code change program 115 analyses the area of interest using the language syntax used to create the program, i.e., product 129, and an associated abstract syntax tree. For example, there is a statement of the type: object A. method1( ) and object A is of the user class C. If C: method 1( ) is in the changeset, then there is a syntactical match. Using the information included in syntax 121, code change program 115 can exclude specific types of code. For example, references to specific objects, such as language objects, can be ignored during the analysis.

In an exemplary embodiment, if the change could not be identified as a textual match or as a syntactical match (decision step 230, no branch), then a message that is generated indicating the change was not identified and the result and the message are saved as part of results 119, in step 235. Code change program 115 then returns to step 215 and continues searching the changesets for additional changes.

In an exemplary embodiment, if the change is identified as a textual match or a syntactical match (decision step 230, yes branch), then code change program 115 saves a copy of the search result as part of results 119, in step 240. In step 245, based on the search result, code change program 115 re-computes the area of interest by taking into account the identified change. The re-computed area of interest is then saved as part of area 113. For example, the search preferences indicate an area of interest corresponding to code lines 10-20. A subsequent search identifies a change that is a textual match, namely the change that indicates code lines 1-5 were added. To re-compute the area of interest the inverse of the change contained in the changeset must be performed. As a result, code change program 115, re-computes the area of interest, included in area 113, to include code lines 5-15 for changesets logged before the change.

In an exemplary embodiment, in step 250, code change program 115 analyzes the contents of the re-computed area of interest, which is included in area 113. Code change program 115 uses the information included in syntax 121 to identify other possible sources of error, which are included in references 127, that may have caused the error identified in product 129. For example, code change program 115 identifies three other programs that work in collaboration with product 129. Code change program 115 then determines that the identified changes affected the collaboration between the programs and adds this information to results 119. After the analysis, code change program 115 returns to step 215.

In an exemplary embodiment, if another possible source of error is identified, then code change program 115 generates a result based on the possible source of error and saves this information as part of results 119. Code change program 115 then analyses the change with respect to the knowledge included in syntax 121 and determines if the change affected area 113, i.e., could have caused the error. For example, a first method call indicates a retrieval of a data from a different program using a second method. An identified change indicates that the class of the second method has been altered. The change in the class of the second method does not by itself initiate a regression in product 129. However, the change may affect communication between product 129 and the other program. As a result, code change program 115 searches references 127 for data indicating other sources which may have been affected by the change. Code change program 115 identifies the program that communicates with product 129 using the second method included in the change. Code change program 115 includes the data relating the change to the other program, as part of results 119, and indicates that there may be a problem with communication between product 129 and the other program due to the class change.

In an exemplary embodiment, if no new changes are identified (decision step 220, no branch), then code change program 115 generates a report of the search results and saves it as part of results 119, in step 255. The report can then be used to guide future changes made to product 129.

Figure 3:
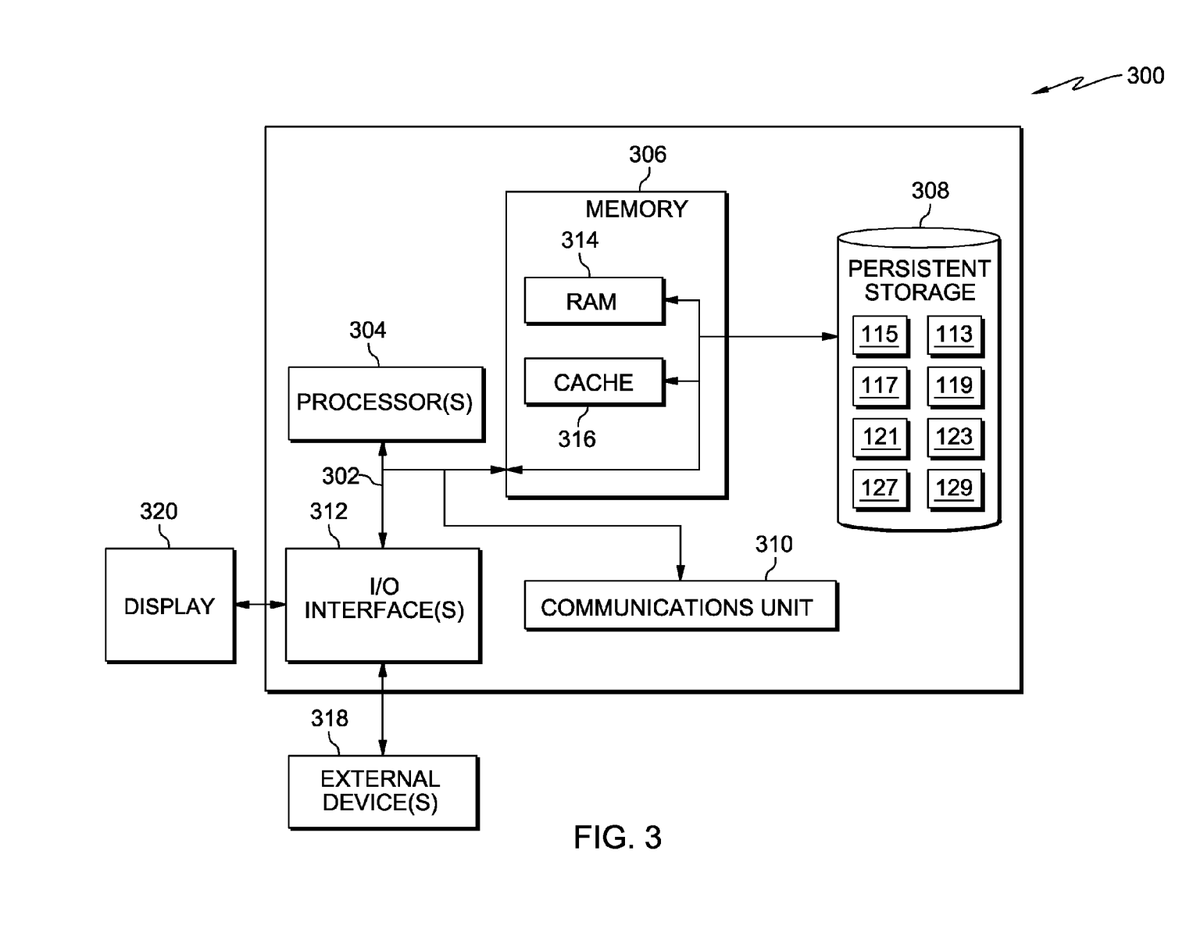
FIG. 3 depicts a block diagram of components of the computing device executing the code change program, within the program testing environment of FIG. 1, in accordance with an exemplary embodiment.

FIG. 3 depicts a block diagram, 300, of the components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Code change program 115, area 113, preferences 117, results 119, syntax 121, changesets 123, references 127, and product 129 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308. Communications unit 310, in these examples, provides for communications with other data processing systems or devices, including resources of storage device 120. In these examples, communications unit 310 includes one or more network interface cards. Communications unit 310 may provide communications through the use of either or both physical and wireless communications links. Code change program 115, area 113, preferences 117, results 119, syntax 121, changesets 123, references 127, and product 129 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., code change program 115, area 113, preferences 117, results 119, syntax 121, changesets 123, references 127, and product 129, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of identifying code changes, the method comprising:
    a computer retrieving a first changeset that is associated with a program based, at least in part, on a search parameter that includes a range of time and a first area of interest that indicates a first portion of a source code of the program;
    the computer identifying a first set of changes included in the first changeset based on a time stamp of a change, wherein a time of the time stamp is included within the range of time, and wherein first set of changes includes a change to a region of the source code that is included in the first area of interest,
    the computer determining whether the change included in the first set of changes is a textual change or a syntactical change to the region of the source code, based on textual matching and syntactical matching, wherein syntactical matching includes a comparison of a first valid syntax of the first set of changes to a second valid syntax of the region of the source code of the program that corresponds to the first set of changes, and wherein the comparison reveals that a syntax of the source code of the program was changed by the first set of changes from second valid syntax to the first valid syntax;
    the computer generating a second area of interest that includes a second portion of the source code of the program by updating the first area of interest based, at least in part, on i) the change being a textual change or a syntactical change and ii) an inverse of an operation included in the change, such that the second area of interest includes a third portion of source code that is not indicated by the first area of interest;
    the computer searching for a second set of changes based, at least in part, on the second area of interest;
    the computer identifying a possible source of an error based, at least in part, on a result of an analysis of a syntax of the second set of changes; and
    the computer generating a result that includes, at least in part, the second set of changes and an indication of the possible source of the error.

2. The method of claim 1, wherein one or both of the first set of changes and the second set of changes include records of changes made to a program.

3. The method of claim 1, wherein one or both of the first set of changes and the second set of changes include changes that have been made to a program.

4. The method of claim 1, wherein the step of the computer generating a second area of interest includes one or more of the steps of:
    identifying changes that are a textual match to the first set of changes;
    identifying one or more changes that are a syntactical match to the first set of changes;
    performing an inverse of an operation included in a change of the one or more changes; and
    generating the second area of interest based, at least in part, on one or both of the inverse of the operation of the one or more changes and the syntactical match.

5. The method of claim 1, wherein the second set of changes are included, at least in part, in a second changeset.

6. The method of claim 1, the method further including the steps of:
    the computer retrieving the second set of changes, wherein the changes included in the second set of changes are selected based one or more of a time stamp of a change, textual matching, and syntactical matching; and
    the computer generating a result that includes, at least in part, the first set of changes and the second set of changes.

7. The method of claim 1, the method further including the step of:
    the computer identifying a third area of interest based, at least in part, on a result of an analysis of the second set of changes.

8. A computer program product for identifying code changes, the computer program product comprising:
    one or more computer-readable storage media and program instructions stored on the one or more computer-readable storage media, wherein the one or more computer-readable storage media are not transitory signals, the program instructions comprising:
    program instructions to retrieve a first changeset that is associated with a program based, at least in part, on a search parameter that includes a range of time and a first area of interest that indicates a first portion of a source code of the program;
    program instructions to identify a first set of changes included in the first changeset based on a time stamp of a change, wherein a time of the time stamp is included within the range of time, and wherein first set of changes includes a change to a region of the source code that is included in the first area of interest,
    the computer determining whether the change included in the first set of changes is a textual change or a syntactical change to the region of the source code, based on textual matching, and syntactical matching, wherein syntactical matching includes a comparison of a first valid syntax of the first set of changes to a second valid syntax of the region of the source code of the program that corresponds to the first set of changes, and wherein the comparison reveals that a syntax of the source code of the program was changed by the first set of changes from second valid syntax to the first valid syntax;

program instructions to generate a second area of interest that includes a second portion of the source code of the program by updating the first area of interest based, at least in part, on i) the change being a textual change or a syntactical change and ii) an inverse of an operation included in the change, such that the second area of interest includes a third portion of source code that is not indicated by the first area of interest;

program instructions to search for a second set of changes based, at least in part, on the second area of interest;

program instructions to identify a possible source of an error based, at least in part, on a result of an analysis of a syntax of the second set of changes; and program instructions to generate a result that includes, at least in part, the second set of changes and an indication of the possible source of the error.

9. The computer program product of claim 8, wherein one or both of the first set of changes and the second set of changes include records of changes made to a program.

10. The computer program product of claim 8, wherein one or both of the first set of changes and the second set of changes include changes that have been made to a program.

11. The computer program product of claim 8, wherein the program instructions to generate a second area of interest includes one or more of:

program instructions to identifying changes that are a textual match to the first set of changes;

program instructions to identify one or more changes that are a syntactical match to the first set of changes;

program instructions to performing an inverse of an operation included in a change of the one or more of changes; and program instructions to generating the second area of interest based, at least in part, on one or both of the inverse of the operation of the one or more changes and the syntactical match.

12. The computer program product of claim 8, wherein the second set of changes are included, at least in part, in a second changeset.

13. The computer program product of claim 8, further comprising:

program instructions to retrieve the second set of changes, wherein the changes included in the second set of changes are selected based one or more of a time stamp of a change, textual matching, and syntactical matching; and program instructions to generate a result that includes, at least in part, the first set of changes and the second set of changes.

14. The computer program product of claim 8, further comprising:

program instructions to identify a third area of interest based, at least in part, on a result of an analysis of the second set of changes.

15. A computer system for identifying code changes, the computer system comprising:

one or more computer processors;

one or more computer-readable storage medium, wherein the one or more computer-readable storage medium are not transitory signals;

program instructions stored on the computer readable storage medium for execution by at least one of the one or more processors, the program instructions comprising:

program instructions to retrieve a first changeset that is associated with a program based, at least in part, on a search parameter that includes a range of time and a first area of interest that indicates a first portion of a source code of the program;

program instructions to identify a first set of changes included in the first changeset based on a time stamp of a change, wherein a time of the time stamp is included within the range of time, and wherein first set of changes includes a change to a region of the source code that is included in the first area of interest, the computer determining whether the change included in the first set of changes is a textual change or a syntactical change to the region of the source code, based on textual matching, and syntactical matching, wherein syntactical matching includes a comparison of a first valid syntax of the first set of changes to a second valid syntax of the region of the source code of the program that corresponds to the first set of changes, and wherein the comparison reveals that a syntax of the source code of the program was changed by the first set of changes from second valid syntax to the first valid syntax;

program instructions to generate a second area of interest that includes a second portion of the source code of the program by updating the first area of interest based, at least in part, on i) the change being a textual change or a syntactical change and ii) an inverse of an operation included in the change, such that the second area of interest includes a third portion of source code that is not indicated by the first area of interest;

program instructions to search for a second set of changes based, at least in part, on the second area of interest;

program instructions to identify a possible source of an error based, at least in part, on a result of an analysis of a syntax of the second set of changes; and program instructions to generate a result that includes, at least in part, the second set of changes and an indication of the possible source of the error.

16. The computer system of claim 15, wherein one or both of the first set of changes and the second set of changes include records of changes made to a program.

17. The computer system of claim 15, wherein one or both of the first set of changes and the second set of changes include changes that have been made to a program.

18. The computer system of claim 15, wherein the program instructions to generate a second area of interest includes one or more of:

program instructions to identifying changes that are a textual match to the first set of changes;

program instructions to identify one or more changes that are a syntactical match to the first set of changes;

program instructions to performing an inverse of an operation included in a change of the one or more of changes; and program instructions to generating the second area of interest based, at least in part, on one or both of the inverse of the operation of the one or more changes and the syntactical match.

19. The computer system of claim 15, further comprising:
program instructions to retrieve the second set of changes, wherein the changes included in the second set of changes are selected based one or more of a time stamp of a change, textual matching, and syntactical matching; and
program instructions to generate a result that includes, at least in part, the first set of changes and the second set of changes.

20. The computer system of claim 15, further comprising:
program instructions to identify a third area of interest based, at least in part, on a result of an analysis of the second set of changes.

* * * * *